United States Patent
Zhao et al.

(10) Patent No.: US 12,467,534 B2
(45) Date of Patent: Nov. 11, 2025

(54) GEARBOX

(71) Applicant: JOYCYC CYCLING TECHNOLOGY (CHONGQING) CO., LTD, Chongqing (CN)

(72) Inventors: Huixing Zhao, Chongqing (CN); Yang Tan, Chongqing (CN); Lijiang Chen, Chongqing (CN)

( * ) Notice: Subject to any disclaimer, the term of this patent is extended or adjusted under 35 U.S.C. 154(b) by 0 days.

(21) Appl. No.: 19/259,562

(22) Filed: Jul. 3, 2025

(65) Prior Publication Data

US 2025/0327517 A1 Oct. 23, 2025

Related U.S. Application Data

(63) Continuation of application No. PCT/CN2024/073380, filed on Jan. 19, 2024.

(30) Foreign Application Priority Data

Feb. 13, 2023 (CN) .......................... 202310106677.2

(51) Int. Cl.
| | |
|---|---|
| F16H 63/32 | (2006.01) |
| F16H 57/02 | (2012.01) |
| F16H 61/36 | (2006.01) |

(52) U.S. Cl.
CPC ............. F16H 63/32 (2013.01); F16H 57/02 (2013.01); F16H 61/36 (2013.01)

(58) Field of Classification Search
CPC .......... F16H 63/32; F16H 57/02; F16H 61/36; F16H 3/10; F16H 2061/044; F16H 2200/2082; F16H 2200/2069; F16H 2200/2084; F16H 2200/2087

USPC ......................................................... 74/368
See application file for complete search history.

(56) References Cited

U.S. PATENT DOCUMENTS

| | | | | |
|---|---|---|---|---|
| 3,872,737 | A * | 3/1975 | Thomas | F16D 11/10 |
| | | | | 74/339 |
| 10,428,941 | B2 * | 10/2019 | Thompson | F16H 63/32 |
| 2018/0195608 | A1 * | 7/2018 | Thompson | F16H 63/18 |
| 2022/0120321 | A1 * | 4/2022 | Quinn | F16H 61/688 |
| 2025/0164007 | A1 * | 5/2025 | Quinn | F16H 61/684 |

FOREIGN PATENT DOCUMENTS

| | | |
|---|---|---|
| CN | 2835077 Y | 11/2006 |
| CN | 101358649 A | 2/2009 |
| CN | 103062395 A | 4/2013 |
| CN | 103697150 A | 4/2014 |
| CN | 105570395 A | 5/2016 |
| CN | 210566057 U | 5/2020 |
| CN | 211574172 U | 9/2020 |
| CN | 113090753 A | 7/2021 |
| CN | 114811040 A | 7/2022 |
| CN | 115195932 A | 10/2022 |

(Continued)

*Primary Examiner* — Victor L Macarthur (57) ABSTRACT

A box-type speed change device includes a box body, a main shaft, a countershaft, a main shaft gears, a countershaft gear and a ratchet. The main shaft and the countershaft are provided in the box body in parallel, the main shaft gear is provided on the main shaft, the countershaft gear meshing with the main shaft gear is provided on the countershaft, and the ratchet meshing with the main shaft gear or/and the countershaft gear is slidably provided on the main shaft and/or the countershaft.

9 Claims, 12 Drawing Sheets

(56) References Cited

FOREIGN PATENT DOCUMENTS

| | | |
|---|---|---|
| CN | 218913706 U | 4/2023 |
| CN | 116044987 A | 5/2023 |
| CN | 218992317 U | 5/2023 |
| CN | 116816928 A | 9/2023 |
| CN | 116857362 A | 10/2023 |
| CN | 116877692 A | 10/2023 |
| EP | 1118804 A2 | 7/2001 |
| JP | 2001349425 A | 12/2001 |

* cited by examiner

GEARBOX

CROSS-REFERENCE TO RELATED APPLICATIONS

This application is a continuation of International Application No. PCT/CN2024/073380, filed on Jan. 19, 2024, and claims priority to Chinese Patent Application 202310106677.2, filed on Feb. 13, 2023, the entire disclosures of which are incorporated herein by reference.

TECHNICAL FIELD

The present application relates to the technical field of transmission systems, and in particular, to a gearbox.

BACKGROUND

In the transmission system of a gearbox, a gearshift control system is required to shift gears in order to achieve the transmission changes between different gear pairs. Most of the existing gearshift control systems use rigid shift forks. When the shift fork drives the ratchet to engage with the gear during gear shifting, the ratchet teeth on the end face of the ratchet and the gear may collide rigidly, leading to gear clashing or jamming. During gear disengagement, forcefully pulling the ratchet can easily damage the ratchet teeth.

A Chinese Patent Application Publication No. CN115195932A discloses a bicycle bottom bracket gearbox with load shifting, which includes a gearshift operating mechanism. This mechanism uses an elastic notch and a spring plate on the shift fork to achieve elasticity through the repeated rebounding deformation of the spring plate. However, in practical use, the spring plate not only needs to undergo repeated deformation but also bears connection and support functions, making it prone to premature fatigue failure. This still results in gear clashing or jamming between the ratchet and the gear, thereby shortening the service life of the gearbox.

In view of the above drawbacks of rigid and elastic shift forks in existing gearshift control systems, there is an urgent need for a solution to overcome these technical problems.

SUMMARY

In view of the deficiencies of the related art, the present application provides a gearbox in which the shift fork is configured such that the fork arm and the fork base are rotatably connected, resulting in low friction, smoother gear engagement and disengagement, and a longer service life for the elastic member. Moreover, it effectively prevents damage to the ratchet teeth caused by gear clashing, jamming, or forceful pulling between the ratchet and the gear.

To address the above technical problems, the present application adopts the following technical solutions:

The present application provides a gearbox, which includes a box-type speed change device and a gear shifting control system, wherein the box-type speed change device comprises a box body, a main shaft and a countershaft mounted in parallel on the box body, at least one main shaft gear is mounted on the main shaft, and a countershaft gear meshing with the main shaft gear is mounted on the countershaft;

a ratchet meshing with the main shaft gear is slidably mounted on the main shaft and/or a ratchet meshing with the countershaft gear is mounted on the countershaft; the ratchet is in driving connection with the gear shifting control system;

wherein the gear shifting control system comprises an elastic shift fork mechanism, a gear shifting guide groove drum rod for driving the elastic shift fork mechanism to move, a gear shifting control gear set for driving the gear shifting guide groove drum rod to rotate, and a gear shifting control mechanism for driving the gear shifting control gear set to rotate, and the gear shifting guide groove drum rod is rotatably mounted on the box body;

wherein the elastic shift fork mechanism comprises a shift fork seat, a shift fork arm rotatably connected to the shift fork seat, and an elastic member for driving the shift fork arm to reset, and when the shift fork arm swings relative to the shift fork seat, the elastic member drives the shift fork arm to reset; and a gear shifting guide groove is provided on a circumferential surface of the gear shifting guide groove drum rod, and an upper end of the shift fork seat is provided with a shift fork convex column, the shift fork convex column is movably provided in the gear shifting guide groove, and a lower end of the shift fork arm is movably connected to the ratchet.

In one embodiment, the box-type speed change device further comprises a chain wheel mounted on the main shaft and cranks mounted at both ends of the main shaft;

the shift fork arm is provided with a lower fork part, and each of inner sides of both ends of the lower fork part is provided with a shift pile, the shift pile is movably provided in a shift fork groove on a circumferential surface of the ratchet.

In one embodiment, an upper part of the shift fork seat is provided with two sliding guide holes in parallel, and the shift fork seat is sleeved on two guide rods through the sliding guide holes, and the two guide rods are mounted on the box body.

In one embodiment, a lower part of the shift fork seat is provided with a mounting groove, the shift fork arm is provided with a fork arm connection part, and the fork arm connection part is mounted in the mounting groove through a fork arm rotating shaft; and the elastic member is a torsion spring, a spring body of the torsion spring is mounted on the fork arm rotating shaft, and an output end of the torsion spring clamps the fork arm connection part and the shift fork seat.

In one embodiment, the fork arm connection part is provided with a containing groove, and the fork arm rotating shaft penetrates the containing groove, the spring body of the torsion spring is mounted in the containing groove, and the output end clamps the shift fork seat after extending out of the containing groove.

In one embodiment, the gear shifting control gear set is mounted on the box body, the gear shifting control gear set comprises a gear shifting control driven gear mounted on the gear shifting guide groove drum rod, and a gear shifting control driving gear meshing with the gear shifting control driven gear; and a return coil spring for driving the gear to reset is provided on one side of the gear shifting control driving gear, one end of the return coil spring is connected to a gear wall of the gear shifting control driving gear, and another end of the return coil spring is connected to a mounting shaft of the gear shifting control driving gear.

In one embodiment, the gear shifting control mechanism comprises a gear shifting pull wire, a pull wire adjusting mechanism and a pull wire controller; and a pull wire mounting groove is provided on the gear shifting control driving gear, one end of the gear shifting pull wire is wound in the pull wire mounting groove, and another end of the gear shifting pull wire passes through the pull wire adjusting mechanism and then enters the pull wire controller.

In one embodiment, the pull wire adjusting mechanism comprises a mounting seat provided on a gearbox housing, an adjusting screw connected to the mounting seat, and a lock nut connected to an adjusting screw;

the mounting seat is provided with a seat body threaded hole, and the seat body threaded hole is communicated with an inside of the gearbox housing;

the adjusting screw is of a hollow structure and is provided with an adjusting thread segment;

the adjusting thread segment is in threaded connection with the seat body threaded hole, and the lock nut is sleeved on the adjusting thread segment and is in threaded connection with the adjusting thread segment; and the elastic shift fork mechanism, the gear shifting guide groove drum rod and the gear shifting control gear set are all provided inside the gearbox housing.

In one embodiment, the adjusting screw is further provided with a screw head connected to the adjusting thread segment, and the mounting seat and the gearbox housing are of an integrally formed structure.

In one embodiment, the pull wire adjusting mechanism further comprises a pull wire conduit, one end of the screw head away from the adjusting thread segment is provided with a conduit recess, and one end of the pull wire conduit is mounted on the conduit recess.

The beneficial effects of the present application are as follows:

(1) The present application adopts a rotatable connection between the shift fork arm and the shift fork base. When the shift fork arm swings relative to the shift fork base, the elastic member always drives the shift fork arm to reset, endowing the fork structure with elasticity. When the elastic shift fork mechanism drives the ratchet to engage with the main shaft gear or countershaft gear, it has a force-relieving effect, thereby avoiding gear clashing or jamming caused by rigid collision between the ratchet teeth on the end face of the ratchet and the main shaft gear or countershaft gear. When the ratchet disengages from the main shaft gear or countershaft gear, it can prevent damage to the ratchet teeth caused by forceful pulling of the ratchet.

(2) The present application adopts the shift fork arm and the shift fork base that are rotatably connected, resulting in low friction during the swing of the shift fork arm, making the engagement and disengagement of the ratchet with the main shaft gear or countershaft gear more flexible. When the shift fork arm swings at a small angle relative to the shift fork base, a large displacement of the ratchet can be obtained. Compared with the overall displacement of the fork adopted in existing rigid shift forks and some elastic shift forks, this design not only has less wear and a longer service life, but also causes small elastic deformation of the elastic member, avoiding premature failure of the elastic member and effectively prolonging the service life of the elastic member, elastic shift fork mechanism, and gearbox.

DETAILED DESCRIPTION OF THE EMBODIMENTS

For the convenience of those skilled in the art to understand, the present application will be further described below in conjunction with the embodiments and the drawings. The contents mentioned in the implementation manners are not intended to limit the present application. The present application is described in detail below with reference to the drawings.

With reference to FIGS. 1 to 15, a gearbox includes a box-type speed change device and a gear shifting control system. The box-type speed change device includes a box body 400, a main shaft 05 and a countershaft 06 provided in parallel on the box body 400. At least one main shaft gear 07 is mounted on the main shaft 05, and a countershaft gear 08 meshing with the main shaft gear 07 is mounted on the countershaft 06. A ratchet 01 meshing with the main shaft gear 07 is slidably mounted on the main shaft 05 and/or a ratchet 01 meshing with the countershaft gear 08 is mounted on the countershaft 06. The ratchet 01 is in driving connection with the gear shifting control system.

The gear shifting control system includes an elastic shift fork mechanism 5, a gear shifting guide groove drum rod 6 for driving the elastic shift fork mechanism 5 to move, a gear shifting control gear set 7 for driving the gear shifting guide groove drum rod 6 to rotate, and a gear shifting control mechanism 8 for driving the gear shifting control gear set 7 to rotate. The gear shifting guide groove drum rod 6 is rotatably mounted on the box body 400.

The elastic shift fork mechanism 5 includes a shift fork base 1, a shift fork arm 3 rotatably connected to the shift fork base 1, and an elastic member 2 for driving the shift fork arm 3 to reset. When the shift fork arm 3 swings relative to the shift fork base 1, the elastic member 2 drives the shift fork arm 3 to reset.

A gear shifting guide groove 61 is provided on a circumferential surface of the gear shifting guide groove drum rod 6. A shift fork convex column 13 is provided at the upper end of the shift fork base 1, and the shift fork convex column 13 is movably provided in the gear shifting guide groove 61. A lower end of the shift fork arm 3 is movably connected to the ratchet 01.

Specifically, one or more the elastic shift fork mechanism 5 and the gear shifting guide groove 61 on the gear shifting guide groove drum rod 6 can be provided as required. A plurality of the main shaft gears 07 and countershaft gears 08 can be provided as required, and different sizes and series of sizes of the main shaft gears 07 and countershaft gears 08 can be provided as required.

In practical application, the gear shifting control mechanism 8 drives the gear shifting control gear set 7 to rotate, and the gear shifting control gear set 7 drives the gear shifting guide groove drum rod 6 to rotate, so that the gear shifting guide groove 61 drives the shift fork convex column 13 to drive the elastic shift fork mechanism 5 to move. During the movement of the elastic shift fork mechanism 5, when the ratchet teeth of the ratchet 01 collide with the ratchet teeth of the main shaft gear 07 or the countershaft gear 08, the shift fork arm 3 swings relative to the shift fork base 1, and the elastic member 2 always drives the shift fork arm 3 to drive the ratchet 01 to reset. The deformation of the elastic member 2 makes the elastic shift fork mechanism 5 have a yielding effect, avoiding gear clashing and jamming during gear engagement, so that the ratchet 01 meshes with the main shaft gear 07 or the countershaft gear 08 to realize gear shifting.

The present application adopts the shift fork arm 3 and the shift fork base 1 that are rotatably connected. When the shift fork arm 3 swings relative to the shift fork base 1, the elastic member 2 always drives the shift fork arm 3 to reset, so that the fork structure has elasticity. When the elastic shift fork mechanism 5 drives the ratchet 01 to engage with the main shaft gear 07 or the countershaft gear 08, it has a force-relieving effect, thereby avoiding gear clashing or jamming caused by rigid collision between the ratchet teeth on the end face of the ratchet 01 and the main shaft gear 07 or the countershaft gear 08. When the ratchet 01 disengages from the main shaft gear 07 or the countershaft gear 08, it can prevent damage to the ratchet teeth caused by forceful pulling of the ratchet 01.

The present application adopts the shift fork arm 3 and the shift fork base 1 that are rotatably connected, resulting in low friction during the swing of the shift fork arm 3, thereby making the engagement and disengagement of the ratchet 01 with the main shaft gear 07 or the countershaft gear 08 more flexible. When the shift fork arm 3 swings at a small angle relative to the shift fork base 1, a large displacement of the ratchet 01 can be obtained. Compared with the overall displacement of the fork adopted in existing rigid shift forks and some elastic shift forks, this design not only has less wear and a longer service life, but also causes small elastic deformation of the elastic member 2, avoiding premature failure of the elastic member 2 and effectively prolonging the service life of the elastic member 2, the elastic shift fork mechanism 5, and the gearbox.

In this embodiment, two sliding guide holes 11 are provided in parallel on the upper part of the shift fork base 1. The shift fork base 1 is sleeved on two guide rods 03 through the sliding guide holes 11, and the two guide rods 03 are mounted on the box body 400. During operation, the shift fork base 1 drives the entire elastic shift fork mechanism and the ratchet 01 to move on the guide rods 03 to realize the engagement and disengagement of the ratchet 01 with the main shaft gear 07 or the countershaft gear 08. Specifically, two sliding guide holes 11 are provided in parallel. The two sliding guide holes 11 enable the shift fork base 1 to be mounted on the two guide rods 03. Such double-guide rod design effectively avoids the shaking and overturning of the shift fork base 1 and the entire elastic shift fork mechanism, so that the gearbox has a stable structure and reliable transmission.

In this embodiment, a mounting groove 12 is provided at the lower part of the shift fork base 1. The shift fork arm 3 is provided with a fork arm connection part 31, and the fork arm connection part 31 is mounted in the mounting groove 12 by a fork arm rotating shaft 4. The elastic member 2 is a torsion spring. The spring body 21 of the torsion spring is mounted on the fork arm rotating shaft 4, and the output end 22 of the torsion spring clamps the fork arm connection part 31 and the shift fork base 1. Specifically, the fork arm connection part 31 is mounted on the fork arm rotating shaft 4. Both ends of the fork arm rotating shaft 4 are mounted on the groove walls on both sides of the mounting groove 12, and the fork arm connection part 31 is accommodated in the mounting groove 12. The structure is compact, and the shift fork arm 3 has good stability when rotating.

In this embodiment, the fork arm connection part 31 is provided with a containing groove 311. The fork arm rotating shaft 4 penetrates the containing groove 311. The spring body 21 of the torsion spring is mounted in the containing groove 311, and the output end 22 extends out of the containing groove 311 and then clamps the shift fork base 1. The spring body 21 of the torsion spring is mounted in the containing groove 311, so that the torsion spring is mounted and positioned. The structure is stable and reliable, and the elastic shift fork mechanism 5 is further more compact.

In this embodiment, the shift fork arm 3 is provided with a lower fork part 32. Each of inner sides of both ends of the lower fork part 32 is provided with a shift pile 321, and the shift pile 321 is movably provided in the shift fork groove 011 on the circumferential surface of the ratchet 01.

In this embodiment, the gear shifting control gear set 7 is mounted on the box body 400. The gear shifting control gear set 7 includes a gear shifting control driven gear 71 mounted on the gear shifting guide groove drum rod 6 and a gear shifting control driving gear 72 meshing with the gear shifting control driven gear 71. One side of the gear shifting control driving gear 72 is provided with a return coil spring 73 for driving the gear to reset. One end of the return coil spring 73 is connected with the gear wall of the gear shifting control driving gear 72, and another end of the return coil spring 73 is connected with the mounting shaft of the gear shifting control driving gear 72. Specifically, the gear shifting control mechanism 8 includes a gear shifting pull wire 81, a pull wire adjusting mechanism 82, and a pull wire controller. The gear shifting control driving gear 72 is provided with a pull wire mounting groove. One end of the gear shifting pull wire 81 is wound around the pull wire mounting groove, and another end of the gear shifting pull wire 81 passes through the pull wire adjusting mechanism 82 and then enters the pull wire controller. The pull wire controller can adopt the existing controller structure, which is not described in detail.

In this embodiment, the pull wire adjusting mechanism 82 is used to adjust the tightness of the gear shifting pull wire 81. When gear shifting is required, the pull wire controller controls the gear shifting pull wire 81 to drive the gear shifting control driving gear 72 to rotate. The gear shifting control driving gear 72 drives the gear shifting control driven gear 71 to rotate, thereby driving the gear shifting guide groove drum rod 6 to rotate, so as to drive the elastic shift fork mechanism 5 to move and make the ratchet 01 mesh with the gear 02 to realize gear shifting. When the force of the gear shifting pull wire 81 driving the gear shifting control driving gear 72 to rotate is released, the return coil spring 73 drives the gear shifting control driving gear 72 to reset.

In order to overcome the technical problems that the existing pull wire adjusting mechanism is mounted on the frame, which is not conducive to observing the tightness state of the gear shifting pull wire in the gearbox, resulting in extremely inconvenient adjustment, and that the gear shifting pull wire is easy to loosen during use after the tightness of the gear shifting pull wire is adjusted. The present application also provides a pull wire adjusting mechanism 82, which includes a mounting seat 100 provided on the gearbox housing 400, an adjusting screw 200 connected with the mounting seat 100, and a lock nut 300 connected with the adjusting screw 200. The mounting seat 100 is provided with a seat body threaded hole 101, and the seat body threaded hole 101 is communicated with the inside of the gearbox housing 400. The adjusting screw 200 is of a hollow structure and is provided with an adjusting thread segment 201. The adjusting thread segment 201 is in threaded connection with the seat body threaded hole 101. The lock nut 300 is sleeved on the adjusting thread segment 201 and is in threaded connection with the adjusting thread segment 201. The elastic shift fork mechanism 5, the gear shifting guide groove drum rod 6, and the gear shifting control gear set 7 are all provided in the gearbox housing 400.

In practical application, one end of the gear shifting pull wire 81 is wound around the gear shifting control driving gear 72, and another end of the gear shifting pull wire 81 sequentially passes through the mounting seat 100 and the adjusting screw 200 and then is connected with the pull wire controller at the handlebar of the frame. When the gear shifting pull wire 81 is just installed, the gear shifting pull wire 81 is still in a loose state. At this time, the adjusting screw 200 and the lock nut 300 on the adjusting thread segment 201 are twisted simultaneously to make the threaded engagement section of the seat body threaded hole 101 of the mounting seat 100 and the adjusting thread segment 201 shorter, so as to increase the length of the adjusting thread segment 201 exposed from the seat body threaded hole 101, that is, increase the length of the adjusting thread segment 201 for sleeving and accommodating the gear shifting pull wire 81, thereby tensioning the gear shifting pull wire 81. After the gear shifting pull wire 81 is tensioned, the adjusting thread segment 201 is twisted alone to make the end face of the adjusting thread segment 201 abut against the mounting seat 100. At this time, the adjusting screw 200 is not easy to be screwed into the seat body thread hole 101 of the mounting seat 100 alone, so as to realize the locking after the gear shifting pull wire 81 is tensioned.

The pull wire adjusting mechanism 82 of the present application is provided with the mounting seat 100 on the gearbox housing 400, so that the components such as the adjusting screw 200 and the lock nut 300 are convenient to install. It is not necessary to install them on other places such as the bicycle frame. While the installation is convenient, the installation position is effectively utilized and other installation space is saved, and the fixing is reliable, so that the structure is stable.

The pull wire adjusting mechanism 82 of the present application is provided with the mounting seat 100 on the gearbox housing 400. When the adjusting thread segment 201 and the lock nut 300 are twisted to adjust the tightness of the gear shifting pull wire 81, the tightness state of the gear shifting pull wire 81 on the gear shifting control driving gear 72 can be observed in real time. Compared with the existing pull wire adjusting device, the convenience and efficiency of adjusting the gear shifting pull wire 81 are effectively improved, thereby improving the assembly efficiency of the gearbox product as a whole and reducing the labor cost.

The pull wire adjusting mechanism 82 of the present application adjusts the looseness or tightness of the gear shifting pull wire 81 by shortening or increasing the screwing length between the adjusting screw 200 and the mounting seat 100, which only requires rotating the adjusting screw 200 forward or backward. This operation is simple and easy for workers to master. Meanwhile, the lock nut 300 is used to lock the gear shifting pull wire 81, preventing it from loosening during use, thereby improving the reliability of gear shifting control for the transmission control mechanism and the overall quality of the gearbox product.

Figure 1:
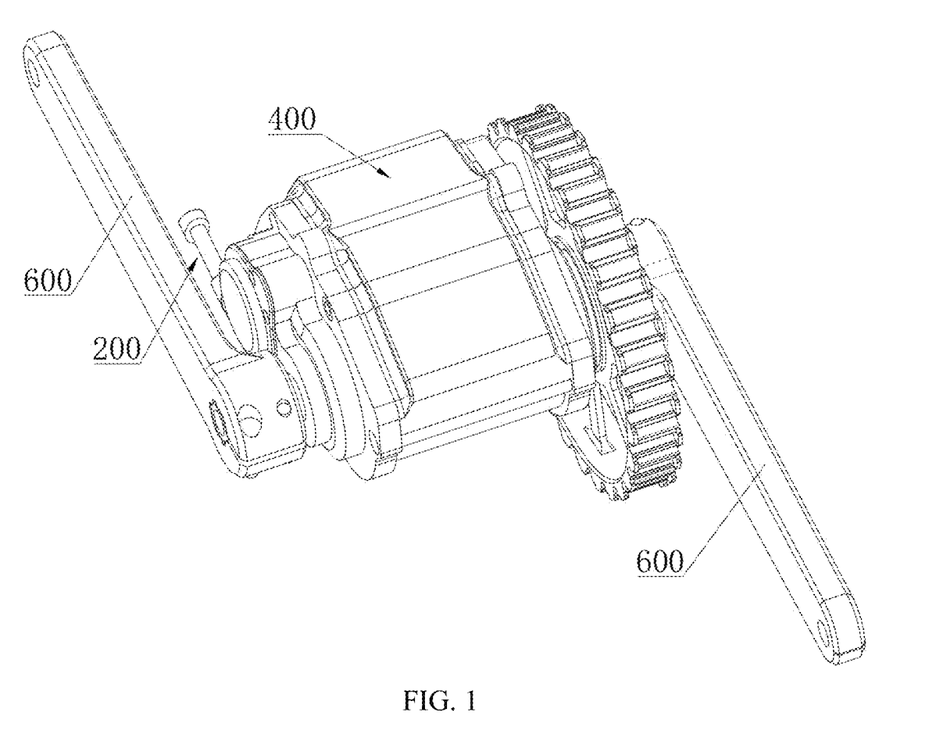
FIG. 1 is a three-dimensional structural schematic diagram of the present application.
Figure 2:
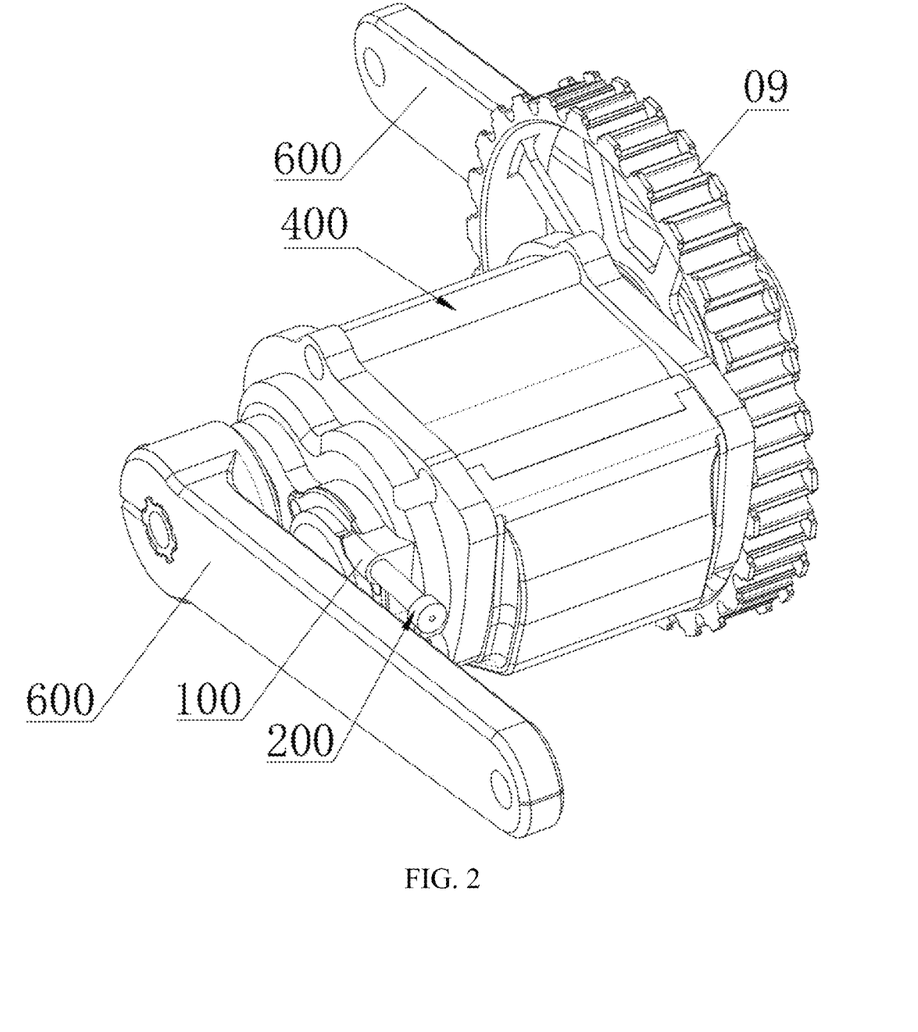
FIG. 2 is a three-dimensional structural schematic diagram of another perspective of the present application.
Figure 3:
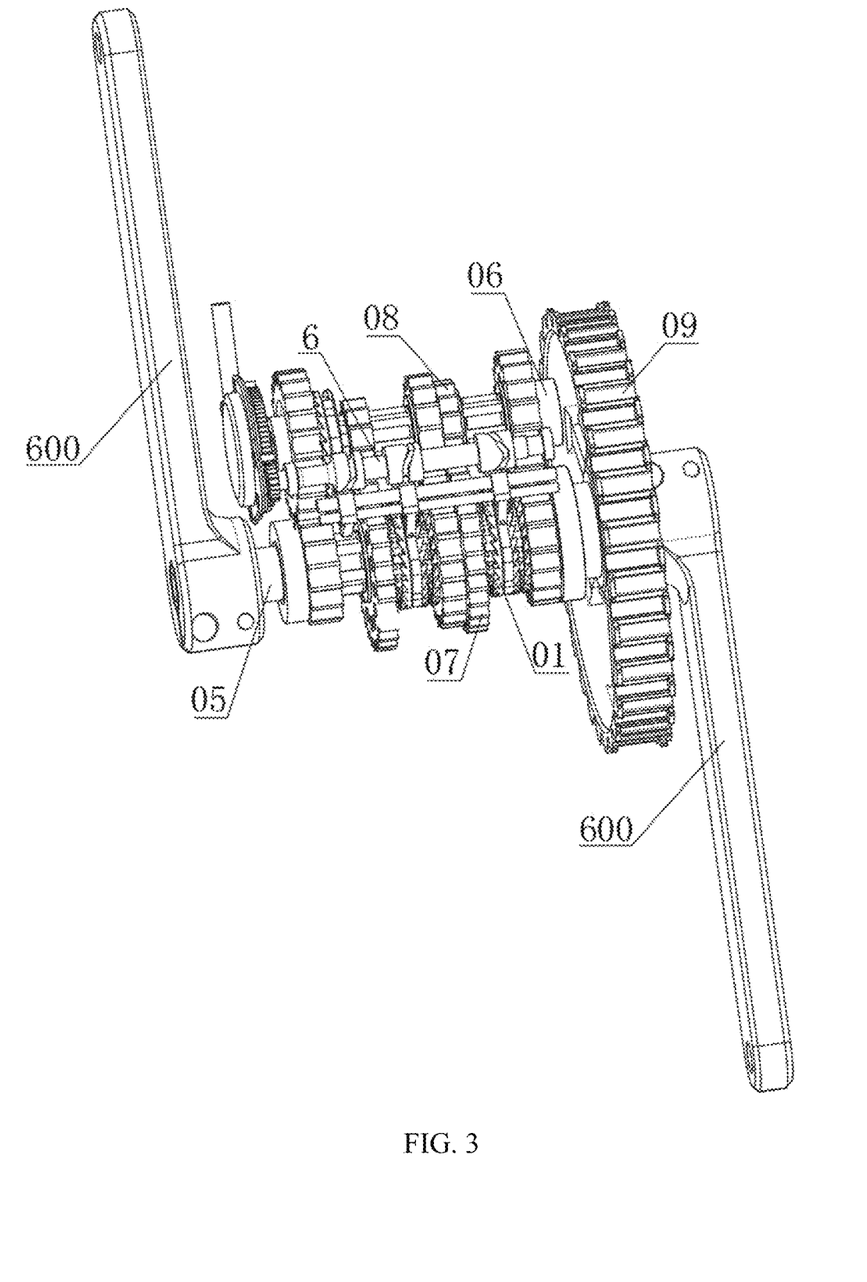
FIG. 3 is a three-dimensional structural schematic diagram of the present application after hiding the box body.
Figure 4:
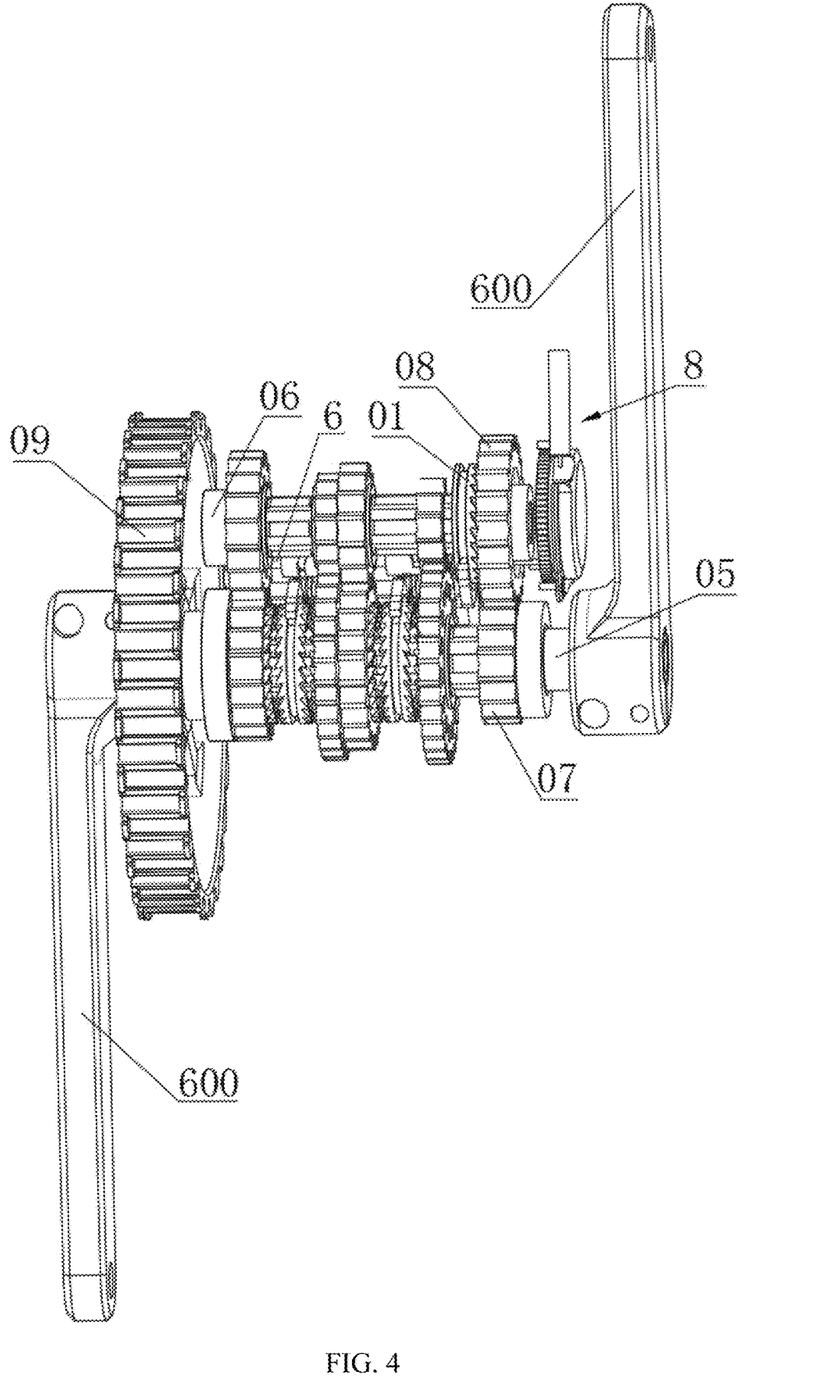
FIG. 4 is a three-dimensional structural schematic diagram of another perspective of the present application after hiding the box body.
Figure 5:
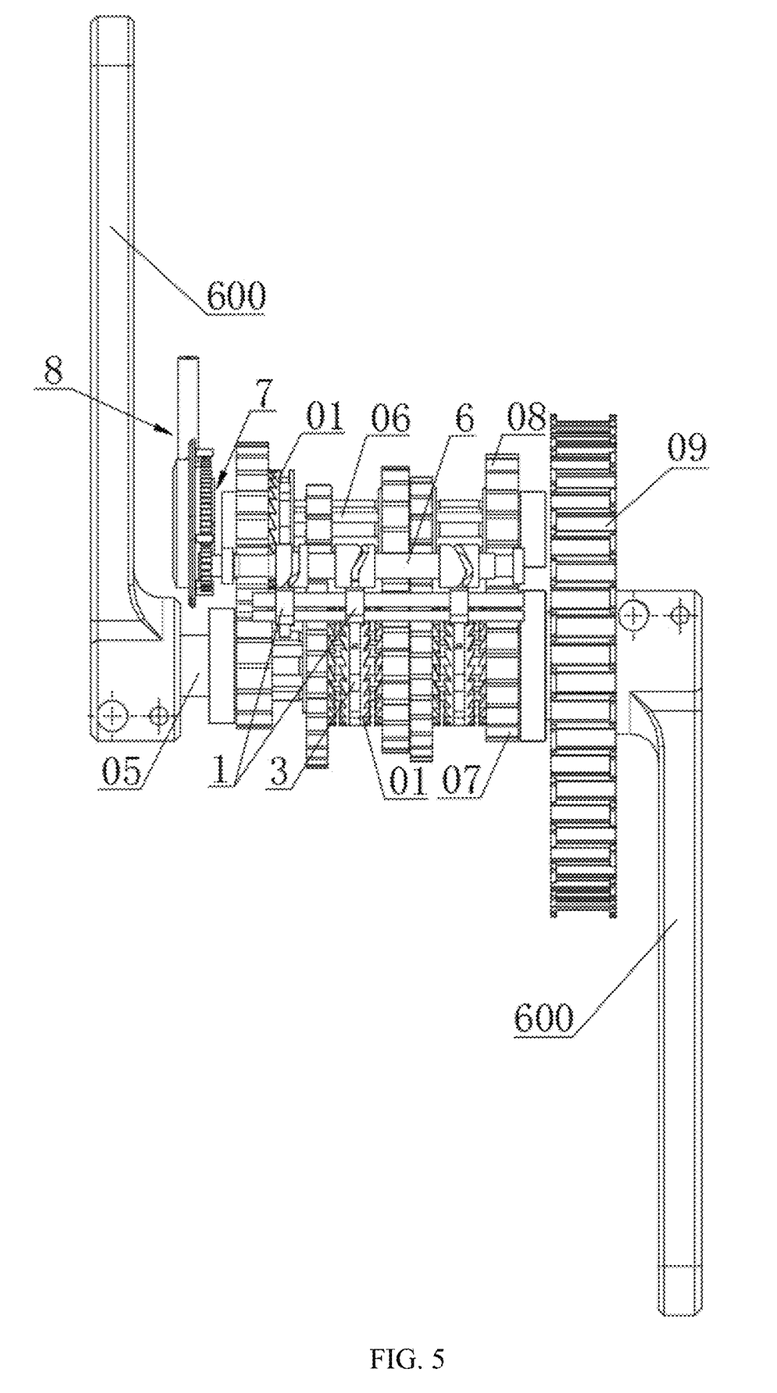
FIG. 5 is a structural schematic diagram of yet another perspective of the present application after hiding the box body.
Figure 6:
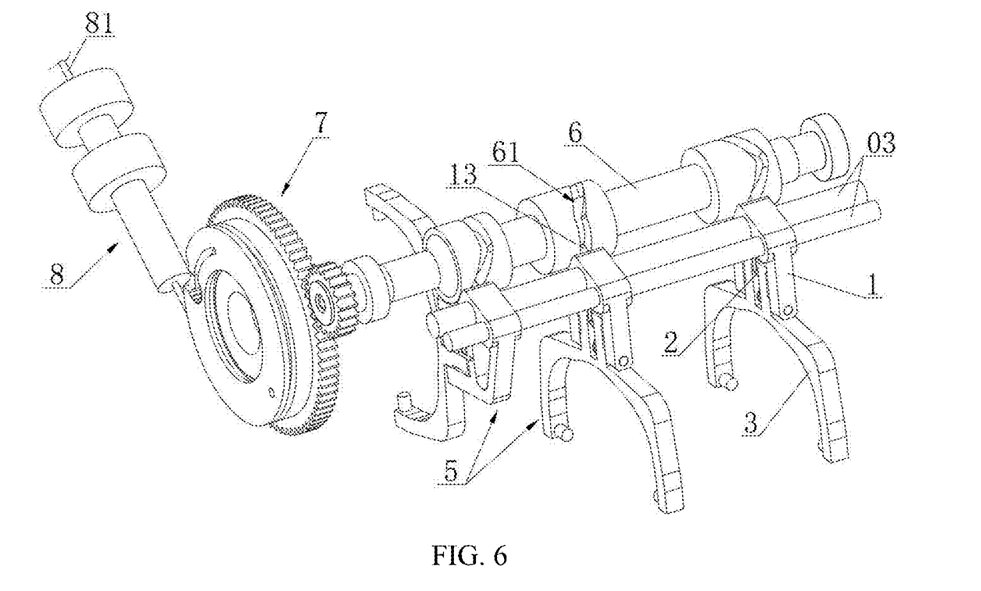
FIG. 6 is a three-dimensional structural schematic diagram of the gear shifting control system of the present application.
Figure 7:
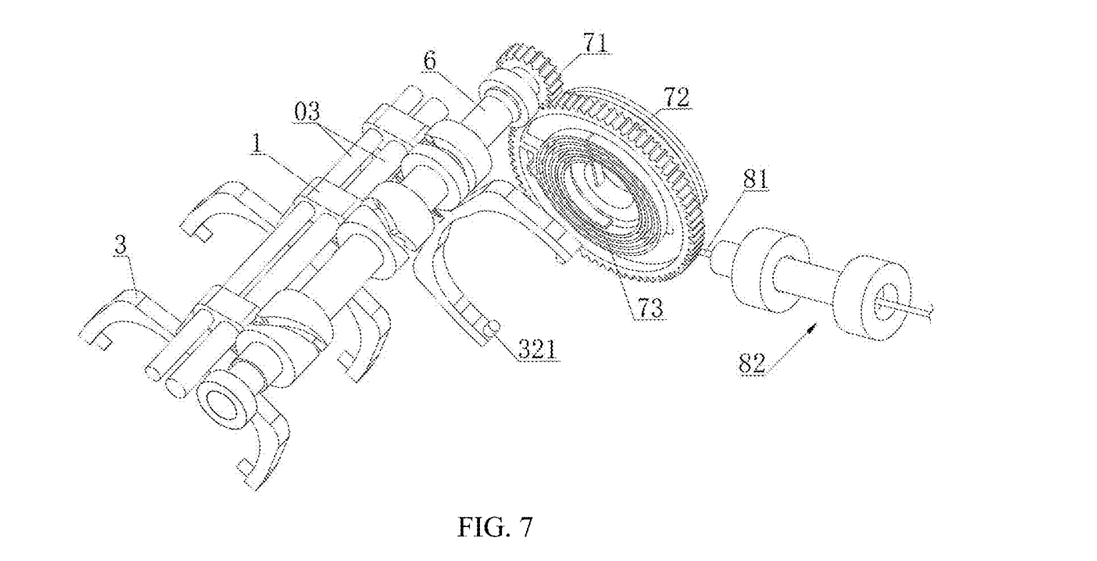
FIG. 7 is a three-dimensional structural schematic diagram of another perspective of the gear shifting control system of the present application.
Figure 8:
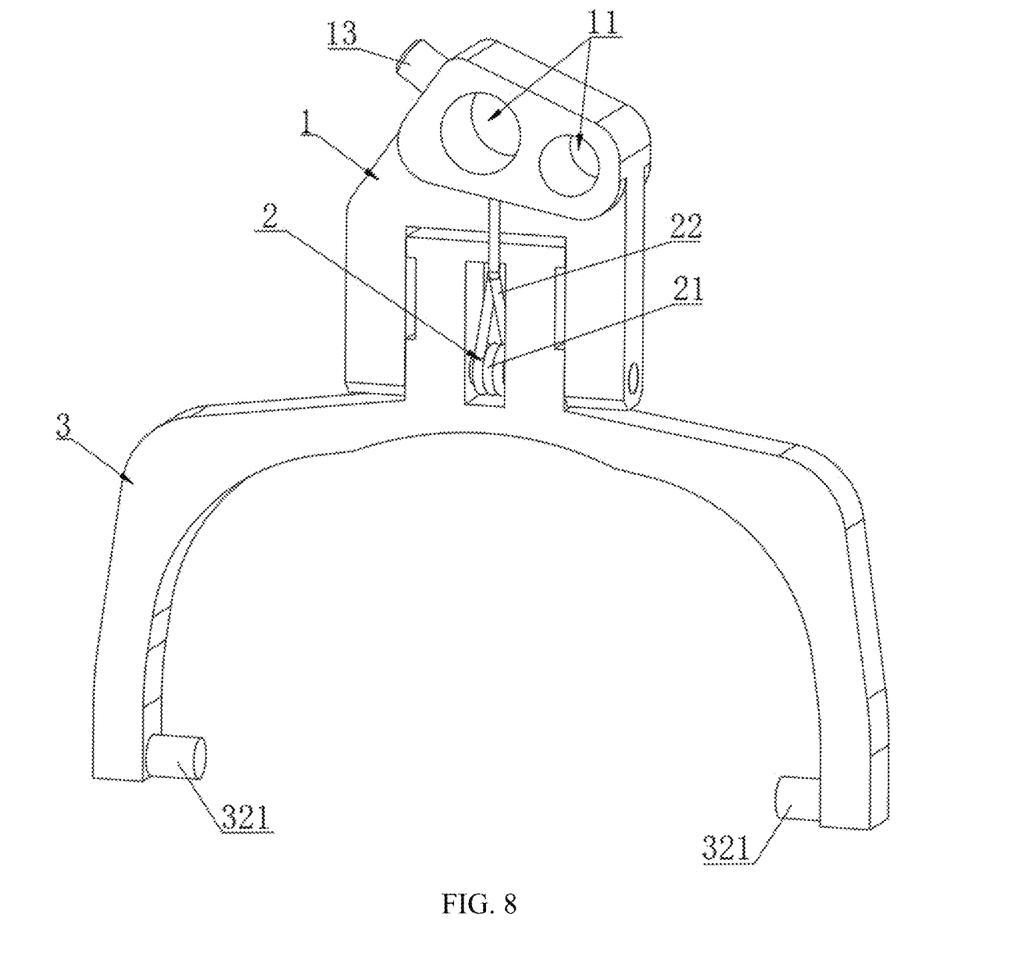
FIG. 8 is a three-dimensional structural schematic diagram of the elastic shift fork mechanism of the present application.
Figure 9:
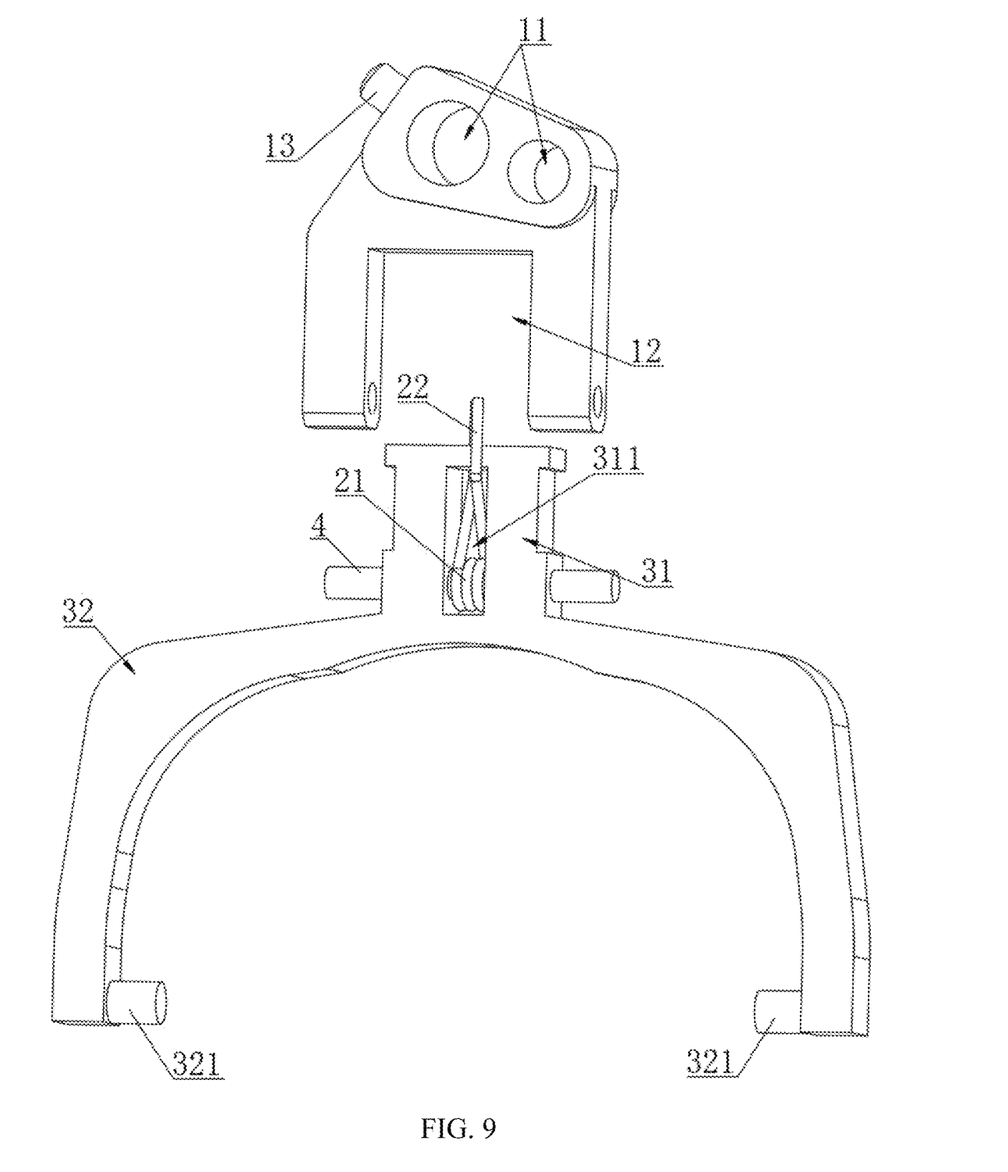
FIG. 9 is an exploded structural schematic diagram of the elastic shift fork mechanism of the present application.
Figure 10:
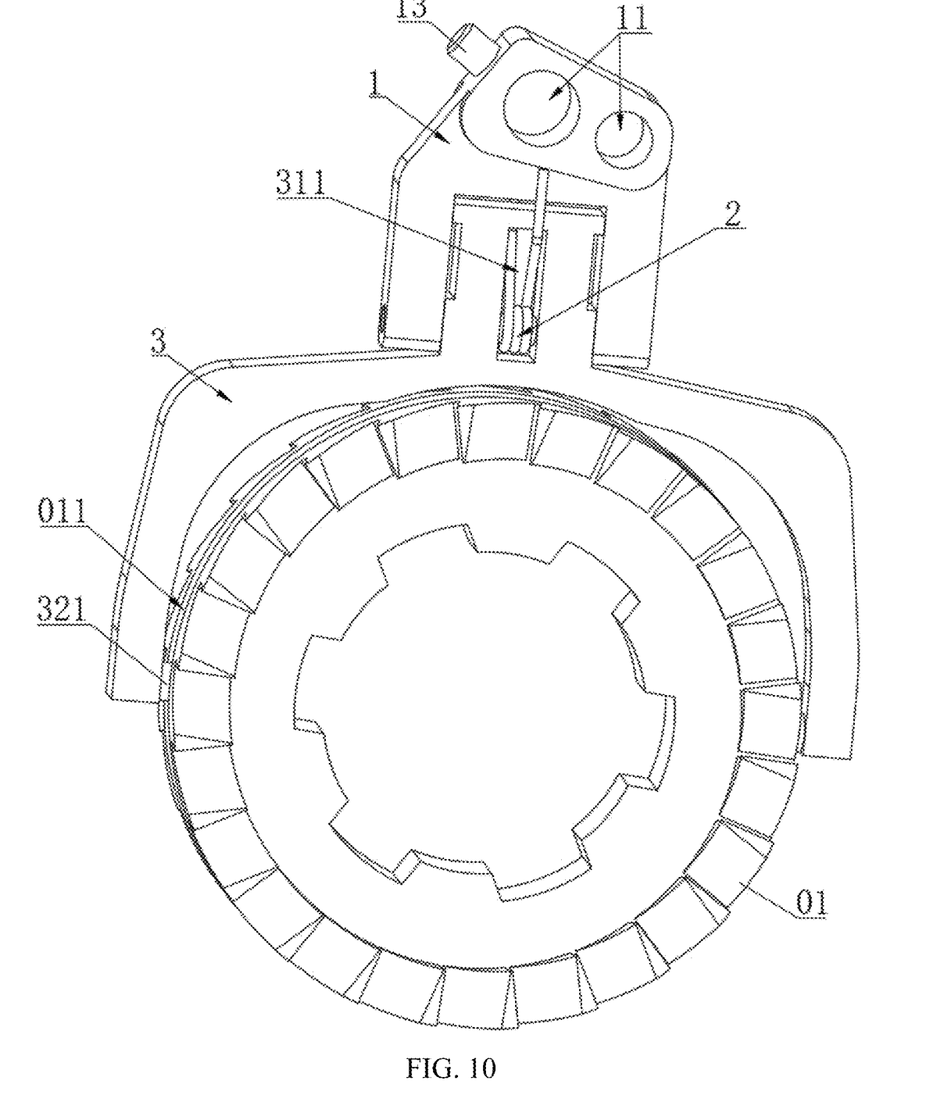
FIG. 10 is a three-dimensional structural schematic diagram of the elastic shift fork mechanism of the present application after installing a ratchet.
Figure 11:
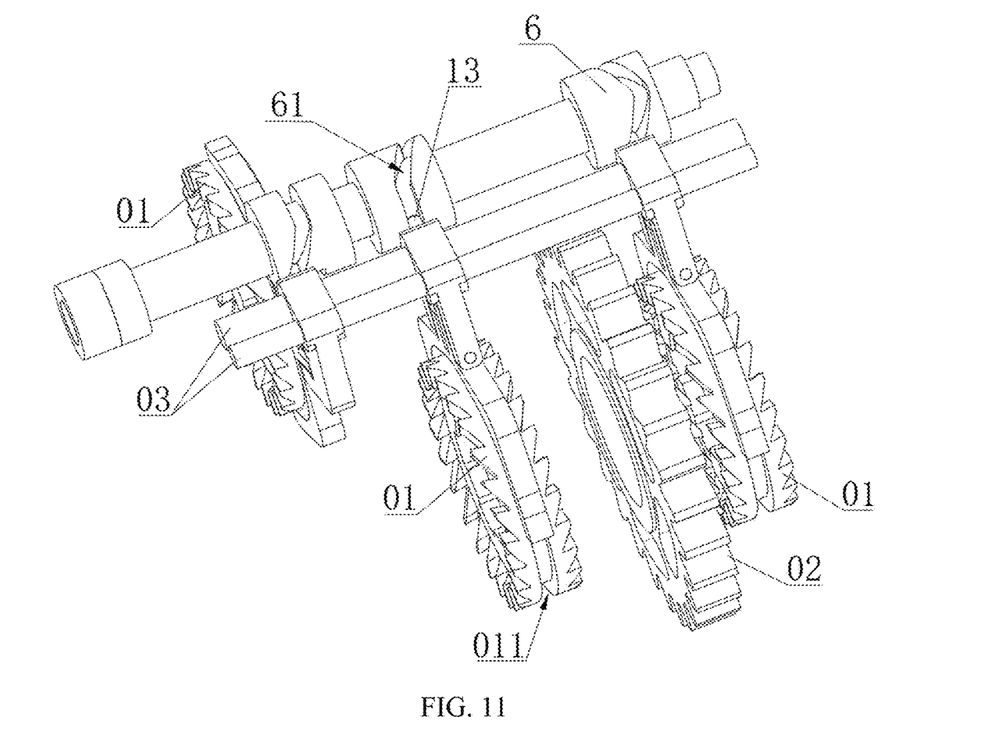
FIG. 11 is a three-dimensional structural schematic diagram of the gear shifting control system of the present application after hiding the gear shifting control gear set and the gear shifting control mechanism.
Figure 12:
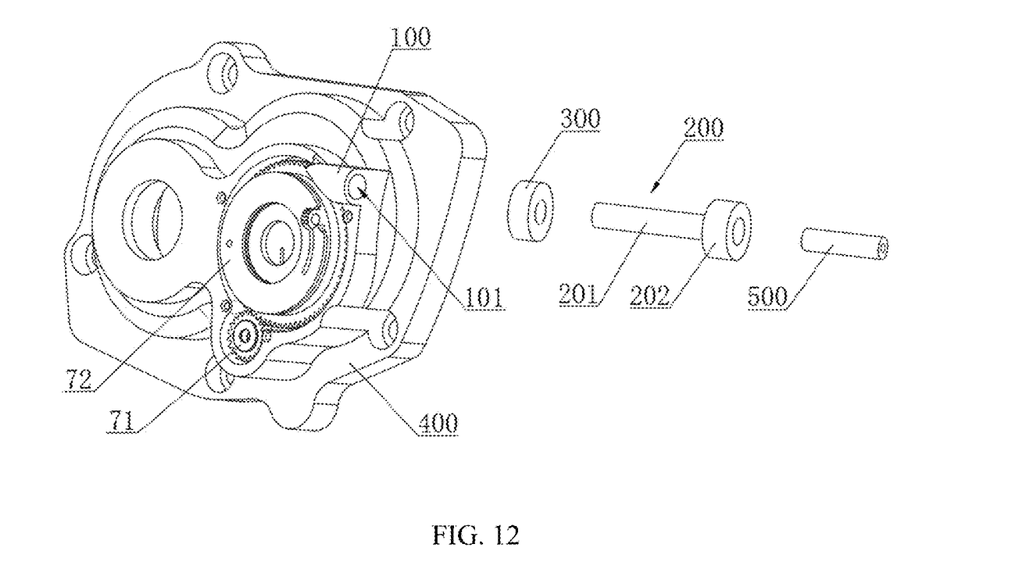
FIG. 12 is an exploded structural schematic diagram of the gear shifting control mechanism of the present application after hiding the pull wire controller.
Figure 13:
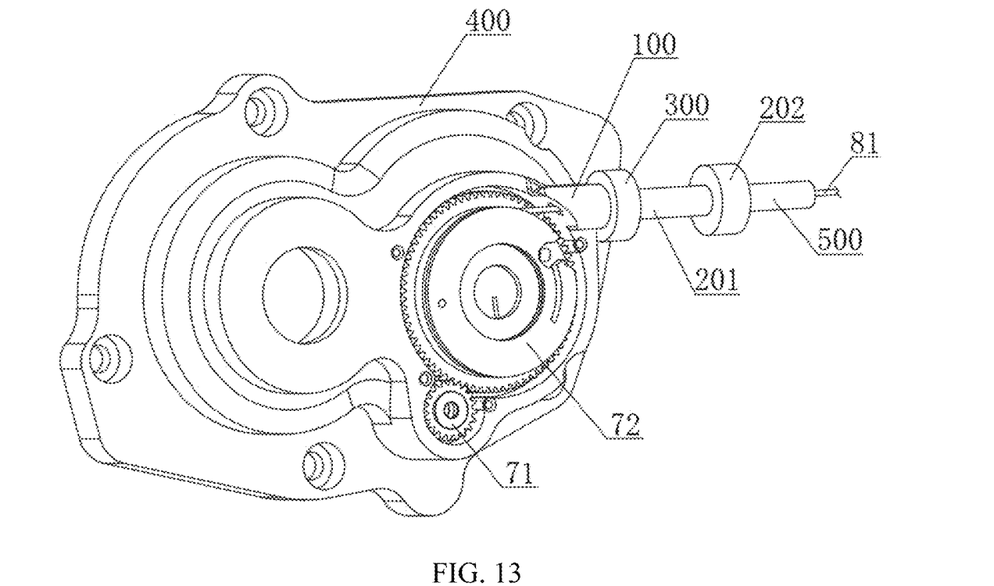
FIG. 13 is a three-dimensional structural schematic diagram of the gear shifting control mechanism of the present application after hiding the pull wire controller.
Figure 14:
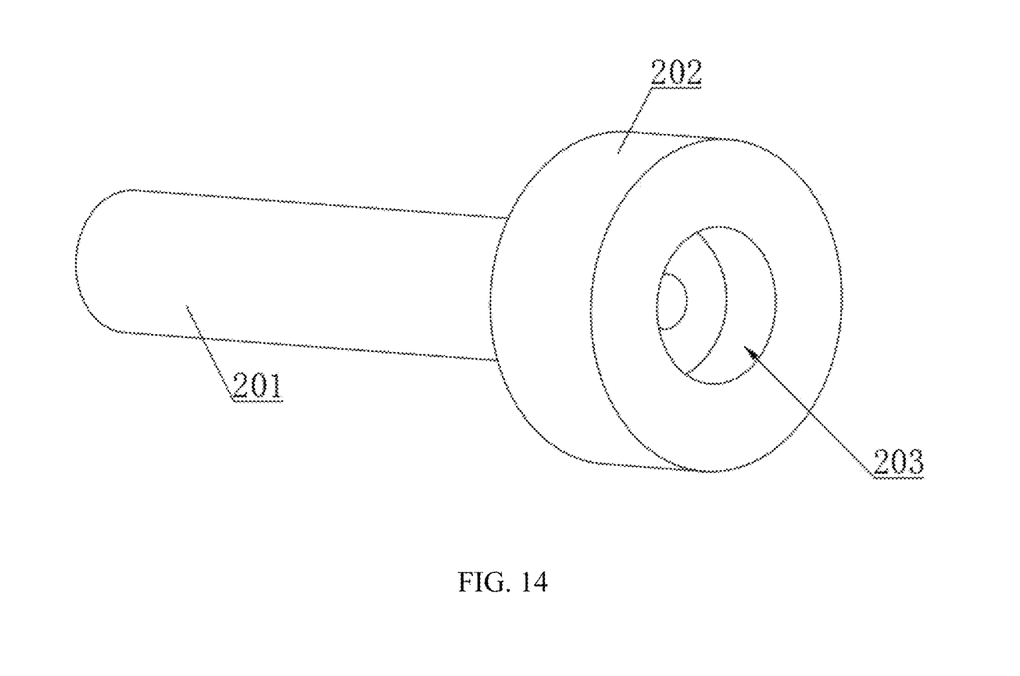
FIG. 14 is a three-dimensional structural schematic diagram of the adjusting screw of the present application.
Figure 15:
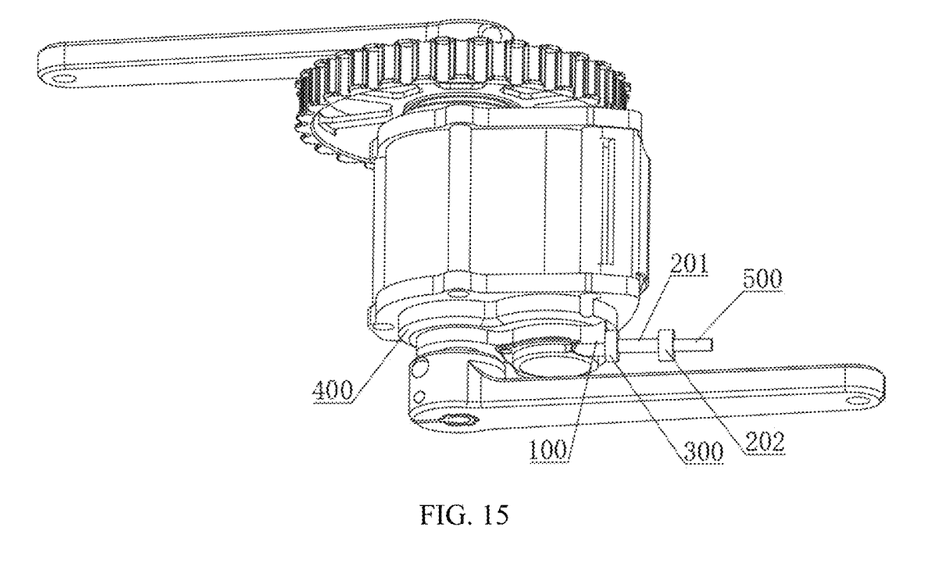
FIG. 15 is a three-dimensional structural schematic diagram of another perspective of the present application.

In this embodiment, the adjusting screw 200 is further provided with a screw head 202 connected to the adjusting thread segment 201, which facilitates screwing adjustment and the installation of other components such as the pull wire conduit 500. The mounting seat 100 and the gearbox housing 400 are of an integrally formed structure. Specifically, the mounting seat 100 and the gearbox housing 400 are processed and formed together, thereby reducing the individual processing of components, which not only avoids the tedious process of processing multiple components and then assembling them, but also makes the installation of components convenient, and the structure more stable after installation.

In this embodiment, the pull wire adjusting mechanism 82 further includes a pull wire conduit 500. One end of the screw head 202 away from the adjusting thread segment 201 is provided with a conduit recess 203, and one end of the pull wire conduit 500 is mounted in the conduit recess 203. The conduit recess 203 is used for accommodating, installing, and positioning the pull wire conduit 500, which is beneficial for the threading and tensioning of the gear shifting pull wire 81.

The above are only preferred embodiments of the present application, and are not intended to limit the present application in any form. Although the present application is disclosed above with preferred embodiments, it is not intended to limit the present application. Any technical personnel familiar with the profession, without departing from the scope of the technical solution of the present application, when making some changes or modifications to the equivalent embodiments with the technical content disclosed above, as long as they do not depart from the technical solution content of the present application, any simple modification, equivalent change, and modification made to the above embodiments according to the technical essence of the present application shall belong to the scope of the technical solution of the present application.

What is claimed is:

1. A gearbox, comprising a speed change device and a gear shifting control system, wherein the speed change device comprises a box body, a main shaft and a countershaft, the main shaft and the countershaft are mounted in parallel on the box body, at least one main shaft gear is mounted on the main shaft, and a countershaft gear meshing with the main shaft gear is mounted on the countershaft;
   a ratchet meshing with the main shaft gear is slidably mounted on the main shaft; the ratchet is in driving connection with the gear shifting control system;
   wherein the gear shifting control system comprises an elastic shift fork mechanism, a gear shifting guide groove drum rod for driving the elastic shift fork mechanism to move, a gear shifting control gear set for driving the gear shifting guide groove drum rod to rotate, and a gear shifting control mechanism for driving the gear shifting control gear set to rotate, and the gear shifting guide groove drum rod is rotatably mounted on the box body;
   wherein the elastic shift fork mechanism comprises a shift fork seat, a shift fork arm rotatably connected to the shift fork seat, and an elastic member for driving the shift fork arm to reset, and after the shift fork arm swings relative to the shift fork seat, the elastic member drives the shift fork arm to reset; and
   a gear shifting guide groove is provided on a circumferential surface of the gear shifting guide groove drum rod, and an upper end of the shift fork seat is provided with a shift fork convex column, the shift fork convex column is movably provided in the gear shifting guide groove, and a lower end of the shift fork arm is movably connected to the ratchet;
   wherein the speed change device further comprises a chain wheel mounted on the main shaft and cranks mounted at both ends of the main shaft; the shift fork arm is provided with a lower fork part, and each of inner sides of both ends of the lower fork part of the shift fork arm is provided with a shift pile, the shift pile is movably provided in a shift fork groove on a circumferential surface of the ratchet.

2. The gearbox according to claim 1, wherein an upper part of the shift fork seat is provided with two sliding guide holes in parallel, and the shift fork seat is sleeved on two guide rods through the sliding guide holes, and the two guide rods are mounted on the box body.

3. The gearbox according to claim 1, wherein a lower part of the shift fork seat is provided with a mounting groove, the shift fork arm is provided with a fork arm connection part, and the fork arm connection part is mounted in the mounting groove through a fork arm rotating shaft; and
   the elastic member is a torsion spring, a spring body of the torsion spring is mounted on the fork arm rotating shaft, and an output end of the torsion spring clamps the fork arm connection part and the shift fork seat.

4. The gearbox according to claim 3, wherein the fork arm connection part is provided with a containing groove, and the fork arm rotating shaft penetrates the containing groove, the spring body of the torsion spring is mounted in the containing groove, and the output end clamps the shift fork seat after extending out of the containing groove.

5. The gearbox according to claim 1, wherein the gear shifting control gear set is mounted on the box body, the gear shifting control gear set comprises a gear shifting control driven gear mounted on the gear shifting guide groove drum rod, and a gear shifting control driving gear meshing with the gear shifting control driven gear; and
   a return coil spring for driving the gear to reset is provided on one side of the gear shifting control driving gear, one end of the return coil spring is connected to a gear wall of the gear shifting control driving gear, and another end of the return coil spring is connected to a mounting shaft of the gear shifting control driving gear.

6. The gearbox according to claim 5, wherein the gear shifting control mechanism comprises a gear shifting pull wire, a pull wire adjusting mechanism and a pull wire controller; and
   a pull wire mounting groove is provided on the gear shifting control driving gear, one end of the gear shifting pull wire is wound in the pull wire mounting groove, and another end of the gear shifting pull wire passes through the pull wire adjusting mechanism and then enters the pull wire controller.

7. The gearbox according to claim 6, wherein the pull wire adjusting mechanism comprises a mounting seat provided on a gearbox housing, an adjusting screw connected to the mounting seat, and a lock nut connected to an adjusting screw;
   the mounting seat is provided with a seat body threaded hole, and the seat body threaded hole is communicated with an inside of the gearbox housing; the adjusting screw is of a hollow structure and is provided with an adjusting thread segment;
   the adjusting thread segment is in threaded connection with the seat body threaded hole, and the lock nut is sleeved on the adjusting thread segment and is in threaded connection with the adjusting thread segment; and
   the elastic shift fork mechanism, the gear shifting guide groove drum rod and the gear shifting control gear set are all provided inside the gearbox housing.

8. The gearbox according to claim 7, wherein the adjusting screw is further provided with a screw head connected to the adjusting thread segment, and the mounting seat and the gearbox housing are of an integrally formed structure.

9. The gearbox according to claim 8, wherein the pull wire adjusting mechanism further comprises a pull wire conduit, one end of the screw head away from the adjusting thread segment is provided with a conduit recess, and one end of the pull wire conduit is mounted on the conduit recess.

* * * * *